(12) United States Patent
Kato et al.

(10) Patent No.: US 9,385,373 B2
(45) Date of Patent: Jul. 5, 2016

(54) BATTERY HAVING ANODE WITH ACTIVE MATERIAL LAYER COMPRISING RESIN CONTAINING LIMITED QUANTITY OF SULFUR

(75) Inventors: Yoshikazu Kato, Fukushima (JP); Kenichi Kawase, Fukushima (JP)

(73) Assignee: SONY CORPORATION, Tokyo (JP)

( * ) Notice: Subject to any disclaimer, the term of this patent is extended or adjusted under 35 U.S.C. 154(b) by 1104 days.

(21) Appl. No.: 11/768,485

(22) Filed: Jun. 26, 2007

(65) Prior Publication Data
US 2008/0160406 A1 Jul. 3, 2008

(30) Foreign Application Priority Data
Jun. 29, 2006 (JP) ................ P2006-179575

(51) Int. Cl.
*H01M 4/60* (2006.01)
*H01M 4/133* (2010.01)
*H01M 4/134* (2010.01)
*H01M 4/62* (2006.01)
*H01M 4/131* (2010.01)
(Continued)

(52) U.S. Cl.
CPC ............. *H01M 4/60* (2013.01); *H01M 4/133* (2013.01); *H01M 4/134* (2013.01); *H01M 4/604* (2013.01); *H01M 4/621* (2013.01); *H01M 4/622* (2013.01); *H01M 4/131* (2013.01); *H01M 10/052* (2013.01); *H01M 10/0525* (2013.01); *Y02E 60/122* (2013.01)

(58) Field of Classification Search
CPC ....... H01M 4/133; H01M 4/134; H01M 4/60; H01M 4/621; H01M 4/622; H01M 4/604; H01M 4/131; H01M 4/587; H01M 4/485; H01M 4/505; H01M 4/525; H01M 10/052; H01M 10/0525; H01M 10/058; H01M 10/0569; Y02E 60/122
USPC ................... 429/209, 213–215, 217; 427/58; 525/534–535, 537
See application file for complete search history.

(56) References Cited

U.S. PATENT DOCUMENTS

| | | | | |
|---|---|---|---|---|
| 5,434,226 A | * | 7/1995 | Nguyen et al. ................ | 525/534 |
| 5,468,571 A | * | 11/1995 | Fujimoto et al. ............. | 429/217 |
| 5,506,075 A | * | 4/1996 | Iwasaki et al. ................ | 429/342 |

(Continued)

FOREIGN PATENT DOCUMENTS

| JP | 10-298386 | 11/1998 |
|---|---|---|
| JP | 10-306193 | 11/1998 |

(Continued)

OTHER PUBLICATIONS

A Japanese Office Action dated Dec. 9, 2008 issued in connection with counterpart Japanese Patent Application No. 2006-179575.

*Primary Examiner* — Sarah A Slifka
(74) *Attorney, Agent, or Firm* — Dentons US LLP

(57) ABSTRACT

A battery capable of improving the safety when the battery is broken while securing the cycle characteristics is provided. The battery includes a cathode, an anode, and an electrolyte. The anode includes an anode active material layer that has a resin containing sulfur (S). Compared to a case not having the resin containing resin, a sufficient discharge capacity can be obtained even when charge and discharge is repeated, and smoking and ignition are not easily generated when the battery is broken. Thereby, the cycle characteristics are secured, and the safety when the battery is broken is improved.

15 Claims, 4 Drawing Sheets

(51) Int. Cl.
*H01M 10/052* (2010.01)
*H01M 10/0525* (2010.01)

(56) References Cited

U.S. PATENT DOCUMENTS

| | | | | |
|---|---|---|---|---|
| 5,824,434 A | * | 10/1998 | Kawakami et al. | 429/209 |
| 2004/0131934 A1 | * | 7/2004 | Sugnaux et al. | 429/209 |
| 2006/0115739 A1 | | 6/2006 | Yamaguchi et al. | |

FOREIGN PATENT DOCUMENTS

| | | |
|---|---|---|
| JP | 2002-298835 | 10/2002 |
| JP | 2002-298915 | 10/2002 |
| JP | 2003-007303 | 1/2003 |
| JP | 2003-123765 | 4/2003 |
| JP | 2004-273437 | 9/2004 |
| JP | 2006-012753 | 1/2006 |
| JP | 2006-156331 | 6/2006 |
| JP | 2006-339092 | 12/2006 |
| WO | 2006/010894 A1 | 2/2006 |

* cited by examiner

BATTERY HAVING ANODE WITH ACTIVE MATERIAL LAYER COMPRISING RESIN CONTAINING LIMITED QUANTITY OF SULFUR

CROSS REFERENCES TO RELATED APPLICATIONS

The present invention contains subject matter related to Japanese Patent Application JP 2006-179575 filed in the Japanese Patent Office on Jun. 29, 2006, the entire contents of which being incorporated herein by reference.

BACKGROUND OF THE INVENTION

1. Field of the Invention

The present invention relates to a battery including a cathode, an anode, and an electrolyte, in which the anode includes an anode active material layer.

2. Description of the Related Art

In recent years, many portable electronic devices such as combination cameras (videotape recorder), digital still cameras, mobile phones, personal digital assistants, and notebook personal computers have been widely used, and their size and weight have been reduced and their high performance and multifunction have been achieved. Accordingly, as a portable power source for the electronic devices, the high capacity of batteries, in particular rechargeable secondary batteries has been aspired, and research and development to improve the energy density of the secondary batteries has been actively promoted Specially, secondary batteries (so-called lithium ion secondary batteries) in which a carbon material such as graphite is used for the anode, and a composite oxide of lithium (Li) and a transition metal is used for the cathode have been practically used widely, since such lithium ion secondary batteries can provide the higher energy density compared to existing lead batteries and nickel cadmium batteries. However, since the capacity of the lithium ion secondary battery is already close to the saturated state, it is extremely difficult to expect the largely increased capacity thereof in the future.

To attain the high capacity of the secondary battery, it has been considered to use a secondary battery (so-called lithium metal secondary battery) using dissolution and precipitation of lithium metal for charge and discharge reaction by using the lithium metal for the anode. However, in the lithium metal secondary battery, while the high capacity can be obtained, efficiency of dissolution and precipitation of lithium is not sufficient. In addition, the lithium metal is easily precipitated in the state of dendrite during the charge.

Therefore, recently, as an improved lithium ion secondary battery, a battery in which the simple substance, an alloy, or a compound of silicon (Si) or tin (Sn) is used for the anode has been actively considered. The theoretical capacity of such a battery system is 2000 mAh or more. In particular, in the case of using the simple substance of silicon, the theoretical capacity thereof reaches about 4000 mAh. Thus, such a lithium ion secondary battery is expected to have the largely increased capacity in the future.

In the field of developing the secondary batteries, not only the structure of the anode but also the structures of respective components of the battery have been considered in various manners. For example, it is proposed to use polyether sulfone as a binder for the cathode (for example, refer to Japanese Unexamined Patent Application Publication No. 2002-298915). Further, it is proposed that for the structure of the separator, a porous membrane including a basic solid particles and a composite binder (main binder and sub binder) is used, and polyether sulfone is used as the main binder (for example, refer to Japanese Unexamined Patent Application Publication No. 2004-273437).

SUMMARY OF THE INVENTION

When the capacity of the secondary battery is increased, the safety when the battery is broken tends to be lowered. Specifically, when safety tests (high temperature test, short circuit test, crush test or the like) are performed in the state of charge, heat is rapidly generated. In some cases, gas is belched, or fire is set. Further, when charge and discharge is repeated, intense expansion or shrinkage is generated depending on some component materials of the anode active material layer. In the result, the anode active material layer is crushed and pulverized. In this case, the current collectivity of the anode is lowered, and thus the cycle characteristics deteriorate.

In view of the foregoing, in the invention, it is desirable to provide a battery capable of improving the safety when the battery is broken while securing the cycle characteristics.

According to an embodiment of the invention, there is provided a battery including a cathode, an anode, and an electrolyte in which the anode includes an anode active material layer having a resin containing sulfur (S).

According to the battery of the embodiment of the invention, the anode active material layer of the anode has the resin containing sulfur. Therefore, while the cycle characteristics are secured, the safety when the battery is broken can be improved. Further, in the case that the anode active material layer contains a carbon material, when the thickness of the anode active material layer (thickness of the anode active material layer on the one side of the anode current collector) is 40 μm or less, the electrode strength can be secured even in the case having the resin containing sulfur. In addition, when the content of the resin containing sulfur is 10 wt % or less, higher cycle characteristics can be obtained. These effects can be also obtained in the case that the anode active material layer contains at least one of the simple substance, an alloy, and a compound of silicon or tin, as long as the thickness of the anode active material layer is 30 μm or less and the content of the resin containing sulfur is 20 wt % or less.

Other and further objects, features and advantages of the invention will appear more fully from the following description.

DETAILED DESCRIPTION OF THE PREFERRED EMBODIMENTS

Embodiments of the invention will be hereinafter described in detail with reference to the drawings.

First Embodiment

Figure 1:
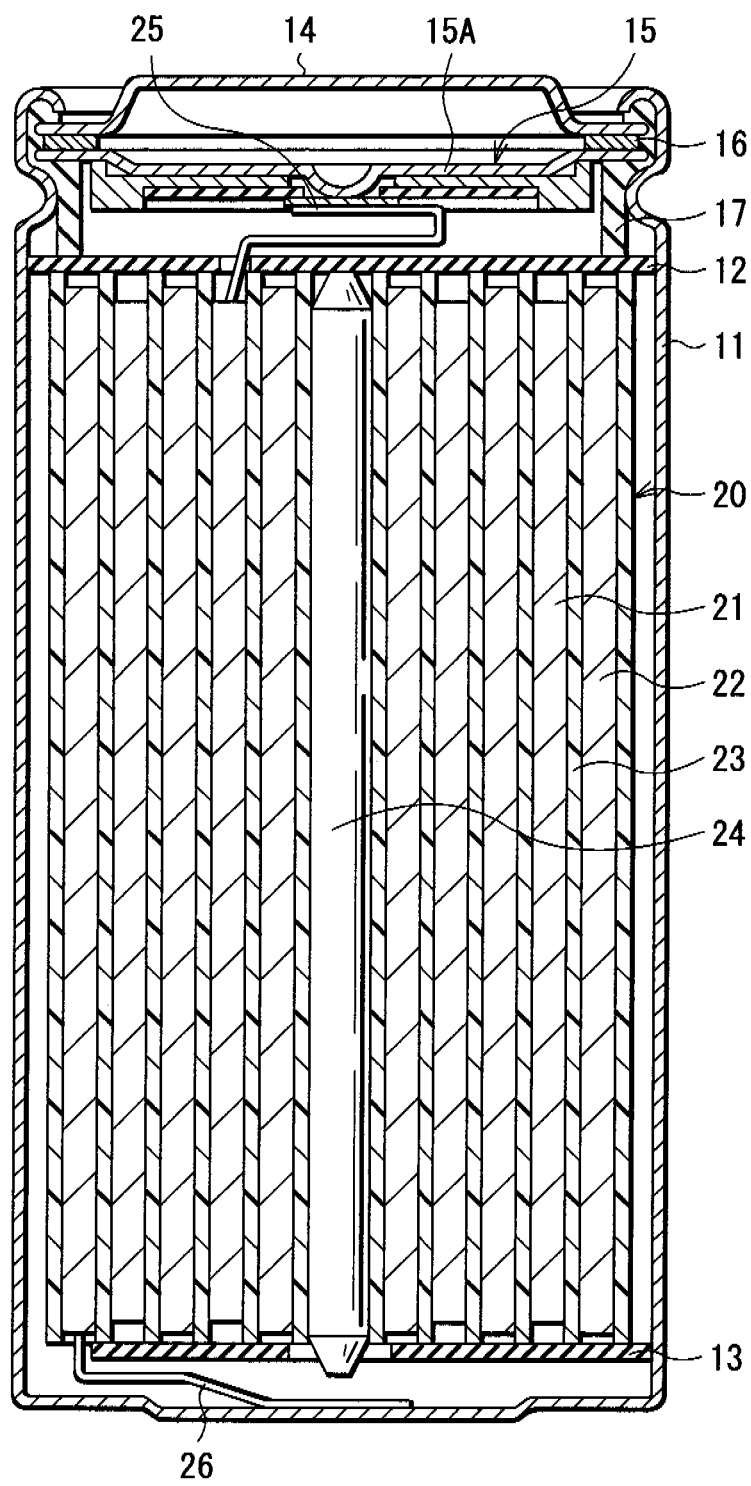
FIG. 1 is a cross section showing a structure of a battery according to a first embodiment of the invention.

FIG. 1 shows a cross sectional structure of a battery according to a first embodiment of the invention. The battery is, for example, a so-called lithium ion secondary battery in which the anode capacity is expressed by the capacity component based on insertion and extraction of lithium as an electrode reactant. FIG. 1 shows a battery structure that is called cylinder type. The battery includes a spirally wound electrode body 20 in which a cathode 21 and an anode 22 are spirally wound with a separator 23 in between, and a pair of insulating plates 12 and 13 inside a battery can 11 in the shape of an approximately hollow cylinder. The battery can 11 is made of, for example, iron (Fe) plated by nickel (Ni). One end of the battery can 11 is closed, and the other end thereof is opened. The pair of insulating plates 12 and 13 is arranged to sandwich the spirally wound electrode body 20 therebetween and to extend perpendicularly to the spirally wound periphery face.

At the open end of the battery can 11, a battery cover 14, and a safety valve mechanism 15 and a PTC (Positive Temperature Coefficient) device 16 provided inside the battery cover 14 are attached by being caulked with a gasket 17. Inside of the battery can 11 is thereby hermetically sealed. The battery cover 14 is made of, for example, a material similar to that of the battery can 11. The safety valve mechanism 15 is electrically connected to the battery cover 14 through the PTC device 16. When the internal pressure of the battery becomes a certain level or more by internal short circuit, external heating or the like, a disk plate 15A flips to cut the electrical connection between the battery cover 14 and the spirally wound electrode body 20. When temperature rises, the PTC device 16 increases the resistance (limits a current) to prevent abnormal heat generation by a large current. The gasket 17 is made of, for example, an insulating material and its surface is coated with asphalt.

For example, a center pin 24 is inserted in the center of the spirally wound electrode body 20. In the spirally wound electrode body 20, a cathode lead 25 made of aluminum (Al) or the like is connected to the cathode 21, and an anode lead 26 made of nickel or the like is connected to the anode 22. The cathode lead 25 is electrically connected to the battery cover 14 by being welded to the safety valve mechanism 15. The anode lead 26 is welded and electrically connected to the battery can 11.

Figure 2:
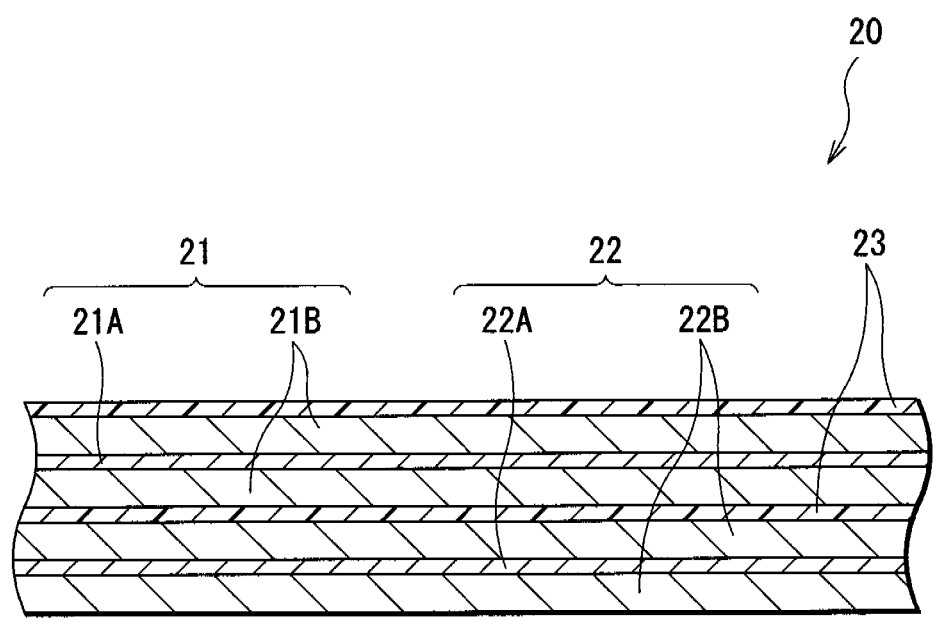
FIG. 2 is a cross section showing an enlarged part of a spirally wound electrode body shown in FIG. 1.

FIG. 2 shows an enlarged part of the spirally wound electrode body 20 shown in FIG. 1. The cathode 21 has a structure in which, for example, a cathode active material layer 21B is provided on the both faces of a cathode current collector 21A having a pair of opposed faces. However, the cathode active material layer 21B may be provided on only one side of the cathode current collector 21A. The cathode current collector 21A is made of, for example, a metal material such as aluminum, nickel, and stainless. The cathode active material layer 21B contains, for example, as a cathode active material, one or more cathode materials capable of inserting and extracting lithium as an electrode reactant. If necessary, the cathode active material layer 21B may contain an electrical conductor (such as a carbon material), a binder (such as polyvinylidene fluoride) and the like.

As the cathode material capable of inserting and extracting lithium, for example, a lithium complex oxide such as a lithium cobalt oxide, a lithium nickel oxide, a solid solution containing them ($Li(Ni_xCo_yMn_z)O_2$), values of x, y, and z are expressed as $0<x<1$, $0<y<1$, $0<z<1$, and $x+y+z=1$), a lithium manganese oxide having a spinel structure ($LiMn_2O_4$), and a solid solution thereof ($Li(Mn_{2-y}Ni_y)O_4$, a value of v is expressed as $v<2$); or a phosphate compound having an olivine structure such as lithium iron phosphate ($LiFePO_4$) is preferable. Thereby, a high energy density can be obtained. In addition to the foregoing, for example, an oxide such as a titanium oxide, a vanadium oxide and a manganese dioxide; a disulfide such as an iron disulfide, a titanium disulfide, and a molybdenum sulfide; a conductive polymer compound such as sulfur, polyaniline, and polythiophene can be cited.

The anode 22 has a structure in which, for example, an anode active material layer 22B is provided on the both faces of an anode current collector 22A having a pair of opposed faces. However, the anode active material layer 22B may be provided on only one side of the anode current collector 22A. The anode current collector 22A is made of a metal material such as copper (Cu), nickel, and stainless. The anode active material layer 22B contains one or more anode materials capable of inserting and extracting lithium and a binder. If necessary, the anode active material layer 22B may contain an electrical conductor (such as a carbon material) and the like.

As the anode material capable of inserting and extracting lithium, for example, a material that is capable of inserting and extracting lithium, and contains at least one of metal elements and metalloid elements as an element can be cited. Such an anode material is preferably used, since a high energy density can be thereby obtained. Such an anode material may be a simple substance, an alloy, or a compound of a metal element or a metalloid element, or may have one or more phases thereof at least in part. In the invention, alloys include an alloy containing one or more metal elements and one or more metalloid elements, in addition to an alloy including two or more metal elements. Further, an alloy may contain nonmetallic elements. The texture thereof includes a solid solution, a eutectic crystal (eutectic mixture), an intermetallic compound, and a texture in which two or more thereof coexist.

As such a metal element or such a metalloid element composing the anode material, for example, a metal element or a metalloid element capable of forming an alloy with lithium can be cited. Specifically, at least one selected from the group consisting of magnesium (Mg), boron (B), aluminum, gallium (Ga), indium (In), silicon, germanium (Ge), tin, lead (Pb), bismuth (Bi), cadmium (Cd), silver (Ag), zinc (Zn), hafnium (Hf), zirconium (Zr), yttrium (Y), palladium (Pd), and platinum (Pt) can be cited. Of the foregoing, silicon or tin is particularly preferable. Silicon and tin have a high ability to insert and extract lithium, and can provide a high energy density.

As such an anode material, for example, an anode material containing tin as a first element, a second element, and a third element is preferable. As the second element, at least one selected from the group consisting of cobalt (Co), iron, magnesium, titanium (Ti), vanadium (V), chromium (Cr), manganese (Mn), nickel, copper, zinc, gallium, zirconium, niobium (Nb), molybdenum (Mo), silver, indium, cerium (Ce), hafnium, tantalum (Ta), tungsten (W), bismuth, and silicon is used. As the third element, at least one selected from the group consisting of boron, carbon (C), aluminum, and phosphorus (P) is used. When the second element and the third element are contained, the cycle characteristics can be improved.

Specially, as such an anode material, a CoSnC-containing material that contains tin, cobalt and carbon as an element, in which the carbon content is from 9.9 wt % to 29.7 wt %, and the cobalt ratio to the total of tin and cobalt (Co/(Sn+Co)) is from 30 wt % to 70 wt % is preferable. In such a composition range, a high energy density can be obtained, and superior cycle characteristics can be obtained.

The CoSnC-containing material may further contain other element according to needs. As other element, for example, silicon, iron, nickel, chromium, indium, niobium, germanium, titanium, molybdenum, aluminum, phosphorus, gallium, or bismuth is preferable. Two or more thereof may be contained, since thereby the battery capacity or the cycle characteristics can be further improved.

The CoSnC-containing material has a phase containing tin, cobalt, and carbon. Such a phase preferably has a low crystallinity structure or an amorphous structure. Further, in the CoSnC-containing material, at least part of carbon as an element is preferably bonded to a metal element or a metalloid element as other element. It is thought that lowering of cycle characteristics is caused by cohesion or crystallization of tin or the like. In this regard, when carbon is bonded to other element, such cohesion or crystallization can be prevented.

As a measurement method for examining bonding state of elements, for example, X-ray Photoelectron Spectroscopy (XPS) can be cited. In XPS, in the case of graphite, the peak of 1s orbit of carbon (C1s) is observed at 284.5 eV in the apparatus in which energy calibration is made so that the peak of 4f orbit of gold atom (Au4f) is obtained in 84.0 eV. In the case of surface contamination carbon, the peak is observed at 284.8 eV. Meanwhile, in the case of higher electric charge density of carbon element, for example, when carbon is bonded to a metal element or a metalloid element, the peak of C1s is observed in the region lower than 284.5 eV. That is, when the peak of the composite wave of C1s obtained for the CoSnC-containing material is observed in the region lower than 284.5 eV, at least part of carbon contained in the CoSnC-containing material is bonded to the metal element or the metalloid element as other element.

In XPS measurement, for example, the peak of C1s used for correcting the energy axis of spectrums. Since surface contamination carbon generally exists on the surface, the peak of C1s of the surface contamination carbon is set to in 284.8 eV, which is used as an energy reference. In XPS measurement, the waveform of the peak of C1s obtained as a form including the peak of the surface contamination carbon and the peak of carbon in the CoSnC-containing material. Therefore, for example, by performing analysis by using commercially available software, the peak of the surface contamination carbon and the peak of carbon in the CoSnC-containing material are separated. In the analysis of the waveform, the position of the main peak existing on the lowest bound energy side is set to the energy reference (284.8 eV).

As the anode material capable of inserting and extracting lithium, in addition to the foregoing metal material, a carbon material such as graphite, non-graphitizable carbon, and graphitizable carbon can be cited. The carbon material and the metal material may be used together. The carbon material has very little change in the crystal structure due to insertion and extraction of lithium. Therefore, for example, when the carbon material is used together with the metal material, a high energy density can be obtained and superior cycle characteristics can be obtained. In addition, the carbon material is preferably used since the carbon material functions as an electrical conductor.

In the secondary battery, by adjusting the amount of the cathode active material and the amount of the anode material capable of inserting and extracting lithium, the charge capacity by the anode material capable of inserting and extracting lithium is set to be larger than the charge capacity by the cathode active material so that lithium metal is not precipitated on the anode 22 when fully charged.

The binder has a resin containing sulfur as an element. Thereby, high cycle characteristics are obtained, and high safety when the battery is broken (preventing smoking and ignition) is obtained. The resin containing sulfur has, for example, a sulfone bond ($-SO_2-$) or thioether bond ($-S-$). In particular, when the resin containing sulfur has the sulfone structure, the resin may have the structure shown in Chemical formula 1.

Chemical formula 1

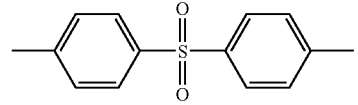

As a resin having the structure shown in Chemical formula 1, for example, a series of resins shown in Chemical formula 2 can be cited. That is, examples of the resin containing sulfur that has the sulfone bond include polysulfone of Chemical formula 2(1), polyether sulfone of Chemical formula 2(2), polyamine sulfone (R1 and R2 represent a hydrogen group or an alkyl group) of Chemical formula 2(3) and the like. Examples of the resin containing sulfur that has the thioether bond include polyphenylene sulfide of Chemical formula 2(4).

Chemical formula 2

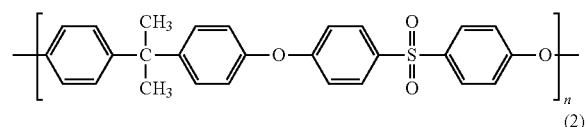

(1)

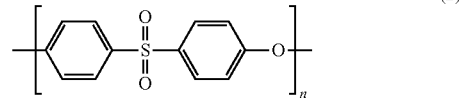

(2)

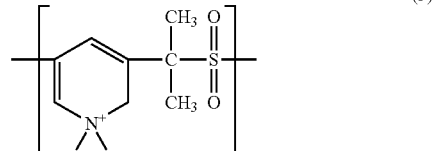

(3)

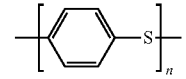

(4)

As a resin having the structure shown in Chemical formula 1, in addition to the foregoing resins, derivatives of various resins into which the sulfone bond or the thioether bond is introduced can be cited. Of the derivatives, as the derivative having the sulfone bond, for example, a derivative of polyimide shown in Chemical formula 3 can be cited.

Chemical formula 3

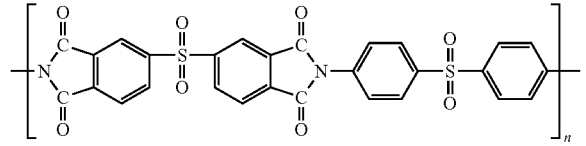

The resins shown as examples of the resin containing sulfur may be used singly, or two or more thereof may be used by mixing.

The thickness of the anode active material layer 22B and the content of the resin containing sulfur in the anode active material layer 22B are preferably set appropriately according to the type of the anode material (anode active material). The thickness of the anode active material layer 22B is the thickness for every formation unit of the anode active material layer 22B. That is, when the anode active material layer 22B is formed on the both faces of the anode current collector 22A, the thickness of the anode active material layer 22B means the thickness on each face (thickness for every anode active material layer 22B).

Specifically, when the anode active material is the carbon material, the thickness of the anode active material layer 22B is 40 μm or less, and preferably in the range from 20 μm to 40 μm. The content of the resin containing sulfur is 10 wt % or less, and preferably in the range from 4 wt % to 10 wt %. When the thickness of the anode active material layer 22B is excessively small, the energy density is excessively lowered. Meanwhile, when the thickness of the anode active material layer 22B is excessively large, the electrode strength (strength of the anode active material layer 22B) becomes insufficient. Further, when the content of the resin containing sulfur is excessively small, the electrode strength becomes insufficient. Meanwhile, when the content of the resin containing sulfur is excessively large, the resistance becomes excessively increased. Therefore, in the foregoing ranges, higher cycle characteristics and a higher electrode strength can be obtained.

When the anode active material is the substance, the alloy, or the compound of silicon or tin, the thickness of the anode active material layer 22B is 30 μm or less and preferably in the range from 5 μm to 30 μm, and the content of the resin containing sulfur is 20 wt % or less, and preferably in the range from 4 wt % to 20 wt %. This range is preferable because of the reason mentioned in the case that the anode active material is the carbon material.

The binder may be made of only the foregoing resin containing sulfur, or may be made of the resin containing sulfur and other type of resin. As other type of resin, for example, at least one selected from the group of consisting of polyvinylidene fluoride, polyimide, and derivatives thereof can be cited. The polyimide is a generic term of polymers having an imide bond (—CONCO—) in the main chain, and has the structure shown in Chemical formula 4. R in Chemical formula 4 represents, for example, an ether bond (—O—), a thioether bond, a sulfone bond, an ester bond (—O—CO—), a methylene group (—CH$_2$—), a dimethyl methylene group (—C(CH$_3$)$_2$—), a carbonyl group (—CO—), or the structures shown in Chemical formula 5. Other type of resin is preferably contained in addition to the resin containing sulfur, since the electrode strength is more increased. The mixing ratio between the resin containing sulfur and other type of resin can be optionally set according to the balance among the cycle characteristics, safety when the battery is broken, and the electrode strength. However, when the cycle characteristics and safety when the battery is broken are taken account, the content of the resin containing sulfur is preferably larger than the content of other type of resin.

Chemical formula 4

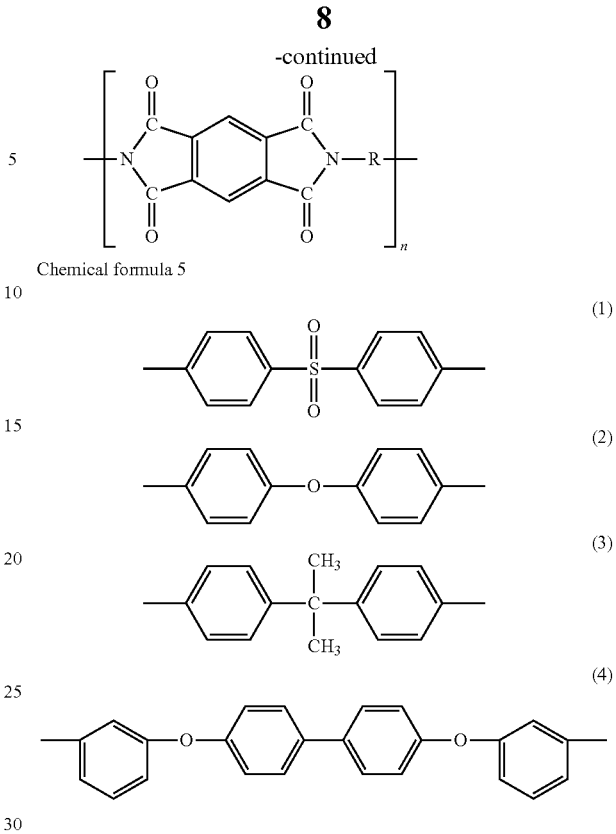

Chemical formula 5

The separator 23 separates the cathode 21 from the anode 22, and passes lithium ions while preventing current short circuit due to contact of the both electrodes. The separator 23 is made of, for example, a porous film made of a synthetic resin such as polytetrafluoroethylene, polypropylene, and polyethylene, or a ceramics porous film. The separator 23 may have a structure in which two or more foregoing porous films are layered.

An electrolytic solution as a liquid electrolyte is impregnated in the separator 23. The electrolytic solution contains a liquid solvent, for example, a nonaqueous solvent such as an organic solvent and an electrolyte salt dissolved in the nonaqueous solvent.

As the nonaqueous solvent, various nonaqueous solvents that have been used from the past can be used. Specifically, for example, ethylene carbonate, propylene carbonate, butylene carbonate, vinylene carbonate, 1,3-dioxole-2-one, 4-vinyl-1,3-dioxolane-2-one, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyl-tetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, trimethylacetic acid methyl, trimethylacetic acid ethyl, acetonitrile, glutaronitrile, adiponitrile, methoxy acetonitrile, 3-methoxy propionitrile, N,N-dimethyl formamide, N-methylpyrrolidinone, N-methyl oxazolidinone, N,N'-dimethyl imidazolidinone, nitromethane, nitroethane, sulfolane, dimethyl sulfoxide phosphoric acid or the like can be cited. One of the foregoing nonaqueous solvents may be used singly, or two or more thereof may be used by mixing. Specially, at least one of ethylene carbonate, propylene carbonate, vinylene carbonate, dimethyl carbonate, and ethyl methyl carbonate is preferably used. Thereby, a superior battery capacity and superior cycle characteristics can be obtained.

The electrolyte salt may contain a light metal salt. Thereby, the electrochemical stability of the electrolytic solution can be improved. As the light metal salt, for example, $LiB(C_6H_5)_4$, $LiCH_3SO_3$, $LiCF_3SO_3$, $LiAlCl_4$, $LiSiF_6$, $LiCl$, $LiBr$, $LiPF_6$, $LiBF_4$, $LiB(OCOCF_3)_4$, $LiB(OCOC_2F_5)_4$, $LiClO_4$, $LiAsF_6$, $LiN(CF_3SO_2)_2$, $LiN(C_2H_5SO_2)_2$, $LiN(C_4F_9SO_2)(CF_3SO_2)$, lithium cyclic 1,2-perfluoroethane disulfonyl imide, 1,3-perfluoro propane disulfonyl imide, lithium cyclic 1,3-perfluoro butane disulfonyl imide, lithium cyclic 1,4-perfluoro butane disulfonyl imide, lithium cyclic perfluoro heptanedioic acid imide or the like can be cited. One of the foregoing electrolyte salts may be used singly, or two or more thereof may be used by mixing. Specially, at least one of $LiPF_6$, $LiBF_4$, $LiClO_4$, and $LiAsF_6$ is preferably used. Thereby, higher electrochemical characteristics and a higher conductivity can be obtained. In particular, it is more preferable that $LiPF_6$ is mixed with at least one of $LiBF_4$, $LiClO_4$, $LiAsF_6$, the lithium imide salt, and the cyclic lithium imide salt. Thereby, higher effects can be obtained.

The content of the electrolyte salt is preferably in the range from 0.3 mol/kg to 3.0 mol/kg to the solvent. In the foregoing range, there is no possibility that the ion conductivity is significantly lowered and thus sufficient battery characteristics are not able to be obtained.

The secondary battery can be manufactured, for example, as follows.

First, for example, the cathode 21 is formed by forming the cathode active material layer 21B on the both faces of the cathode current collector 21A. The cathode active material layer 21B is formed, for example, as follows. Cathode active material powder, an electrical conductor, and a binder are mixed to prepare a cathode mixture, which is dispersed in a solvent such as N-methyl-2-pyrrolidone to obtain paste cathode mixture slurry. Then, the cathode current collector 21A is coated with the cathode mixture slurry, which is dried, and the resultant is compression-molded. Further, for example, in the same manner as in the cathode 21, the anode 22 is formed by forming the anode active material layer 22B on the both faces of the anode current collector 22A. The anode active material layer 22B is formed, for example, as follows. An anode active material, an electrical conductor, and a binder including a resin containing sulfur are mixed to prepare an anode mixture, which is dispersed in a solvent such as N-methyl-2-pyrrolidone to obtain paste anode mixture slurry. Then, the anode current collector 22A is coated with the anode mixture slurry, which is dried, and the resultant is compression-molded.

Subsequently, the cathode lead 25 is welded to the cathode current collector 21A, and the anode lead 26 is welded to the anode current collector 22A. Subsequently, the cathode 21 and the anode 22 are spirally wound with the separator 23 in between, and thereby the spirally wound electrode body 20 is formed. The end of the cathode lead 25 is welded to the safety valve mechanism 15, and the end of the anode lead 26 is welded to the battery can 11. After that, the spirally wound electrode body 20 is sandwiched between the pair of insulating plates 12 and 13, and contained inside the battery can 11. Subsequently, an electrolytic solution is injected into the battery can 11 and impregnated in the separator 23. Finally, at the open end of the battery can 11, the battery cover 14, the safety valve mechanism 15, and the PTC device 16 are fixed by being caulked with the gasket 17. The secondary battery shown in FIGS. 1 and 2 is thereby completed.

In the secondary battery, when charged, for example, lithium ions are extracted from the cathode 21 and inserted in the anode 22 through the electrolytic solution. When discharged, for example, lithium ions are extracted from the anode 22, and inserted in the cathode 21 through the electrolytic solution. Then, in the secondary battery, the resin containing sulfur is included in the anode active material layer 22B of the anode 22 as a binder. Therefore, compared to a case that the resin containing sulfur is not included, even when charge and discharge is repeated, a sufficient discharge capacity is obtained, and smoking and ignition are hardly generated when the battery is broken.

According to the secondary battery, the capacity of the anode is expressed by the capacity component based on insertion and extraction of lithium, and the anode active material layer 22B of the anode 22 has a resin containing sulfur as a binder. Therefore, while the cycle characteristics are maintained, safety when the battery is broken can be improved.

In particular, when the carbon material is contained in the anode active material layer 22B as an anode active material, and the thickness of the anode active material layer 22B is in the range from 20 μm to 40 μm, the electrode strength can be secured even when the binder has the resin containing sulfur. Further, when the content of the resin containing sulfur is in the range from 4 wt % to 10 wt %, the higher cycle characteristics can be obtained.

Meanwhile, in the case that the anode active material layer 22B contains the simple substance, the alloy, or the compound of silicon or tin as an anode active material, when the thickness of the anode active material layer 22B is in the range from 5 μm to 30 μm and when the content of the resin containing sulfur is in the range from 4 wt % to 20 wt %, effects similar to those in the case containing the carbon material as an anode active material can be obtained.

Second Embodiment

A battery according to a second embodiment of the invention has a structure, operations, and effects similar to those of the battery of the foregoing first embodiment, except that the structure of the anode is different, and can be similarly manufactured. Therefore, descriptions will be given with reference to FIG. 1 and FIG. 2 by using the same symbols for the corresponding elements. Descriptions of the same elements will be omitted.

The anode 22 has a structure in which the anode active material layer 22B is provided on the both faces of the anode current collector 22A similarly to in the first embodiment. The anode active material layer 22B contains an anode active material containing, for example, tin or silicon as an element. As the anode active material, for example, the simple substance, an alloy, or a compound of tin, or the simple substance, an alloy, or a compound of silicon can be cited. The anode active material may be used singly, or two or more thereof may be used by mixing.

The anode active material layer 22B may be formed by using, for example, vapor-phase deposition method, liquid-phase deposition method, spraying method, firing method, or two or more of these methods. The anode active material layer 22B and the anode current collector 22A are preferably alloyed at the interface thereof at least in part. Specifically, it is preferable that at the interface thereof, the element of the anode current collector 22A be diffused in the anode active material layer 22B, or the element of the anode active material be diffused in the anode current collector 22A, or both elements be diffused therein. Thereby, fracture due to expansion and shrinkage of the anode active material layer 22B associated with charge and discharge can be prevented, and electron conductivity between the anode active material layer 22B and the anode current collector 22A can be improved.

As vapor-phase deposition method, for example, physical deposition method or chemical deposition method can be cited. Specifically, vacuum vapor deposition method, sputtering method, ion plating method, laser ablation method, thermal CVD (Chemical Vapor Deposition) method, plasma CVD method and the like can be cited. As liquid-phase deposition method, a known technique such as electrolytic plating and electroless plating can be used. Firing method is, for example, a method in which a particulate anode active material, a binder and the like are mixed and dispersed in a solvent, and then the anode current collector 22A is coated with the mixture, and the resultant is heat-treated at a temperature higher than the melting point of the binder and the like. For firing method, a known technique such as atmosphere firing method, reactive firing method, and hot press firing method is available.

Third Embodiment

Figure 3:
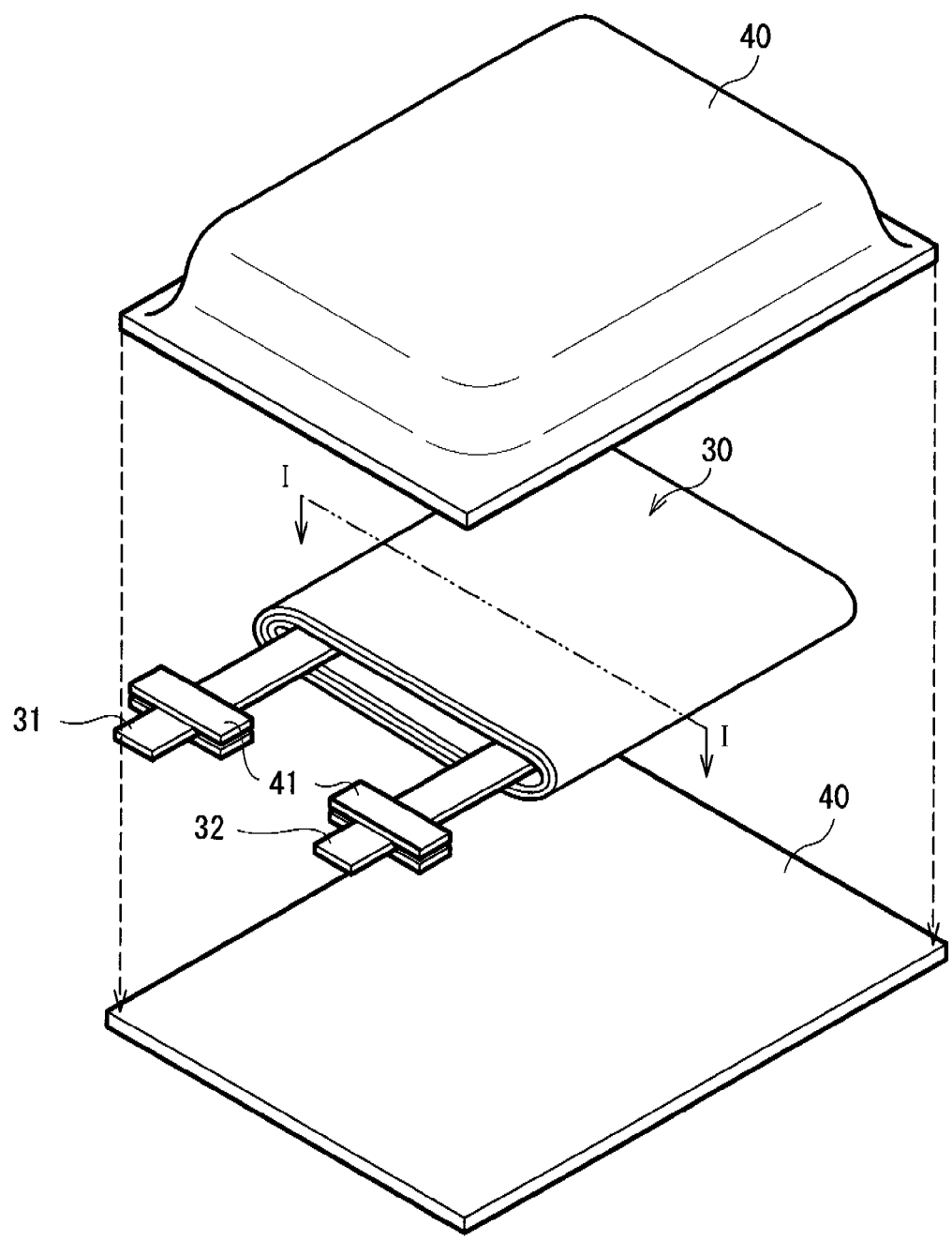
FIG. 3 is an exploded perspective view showing a structure of a battery according to a third embodiment of the invention.

FIG. 3 shows an exploded perspective structure of a battery according to a third embodiment of the invention. In the battery, a spirally wound electrode body 30 on which a cathode lead 31 and an anode lead 32 are attached is contained inside a film package member 40. The battery structure is a so-called laminated type structure.

The cathode lead 31 and the anode lead 32 are respectively directed from inside to outside of the package member 40 in the same direction, for example. The cathode lead 31 and the anode lead 32 are respectively made of, for example, a metal material such as aluminum, copper, nickel, and stainless, and are in the shape of a thin plate or mesh.

The package member 40 is made of a rectangular aluminum laminated film in which, for example, a nylon film, an aluminum foil, and a polyethylene film are bonded together in this order. The package member 40 is, for example, arranged so that the polyethylene film faces the spirally wound electrode body 30, and the respective outer edges are contacted to each other by fusion bonding or an adhesive. Adhesive films 41 to protect from entering of outside air are inserted between the package member 40 and the cathode lead 31, the anode lead 32. The adhesive film 41 is made of a material having contact characteristics to the cathode lead 31 and the anode lead 32, for example, is made of a polyolefin resin such as polyethylene, polypropylene, modified polyethylene, and modified polypropylene.

The exterior member 40 may be made of a laminated film having other structure, a polymer film such as polypropylene, or a metal film, instead of the foregoing three-layer aluminum laminated film.

Figure 4:
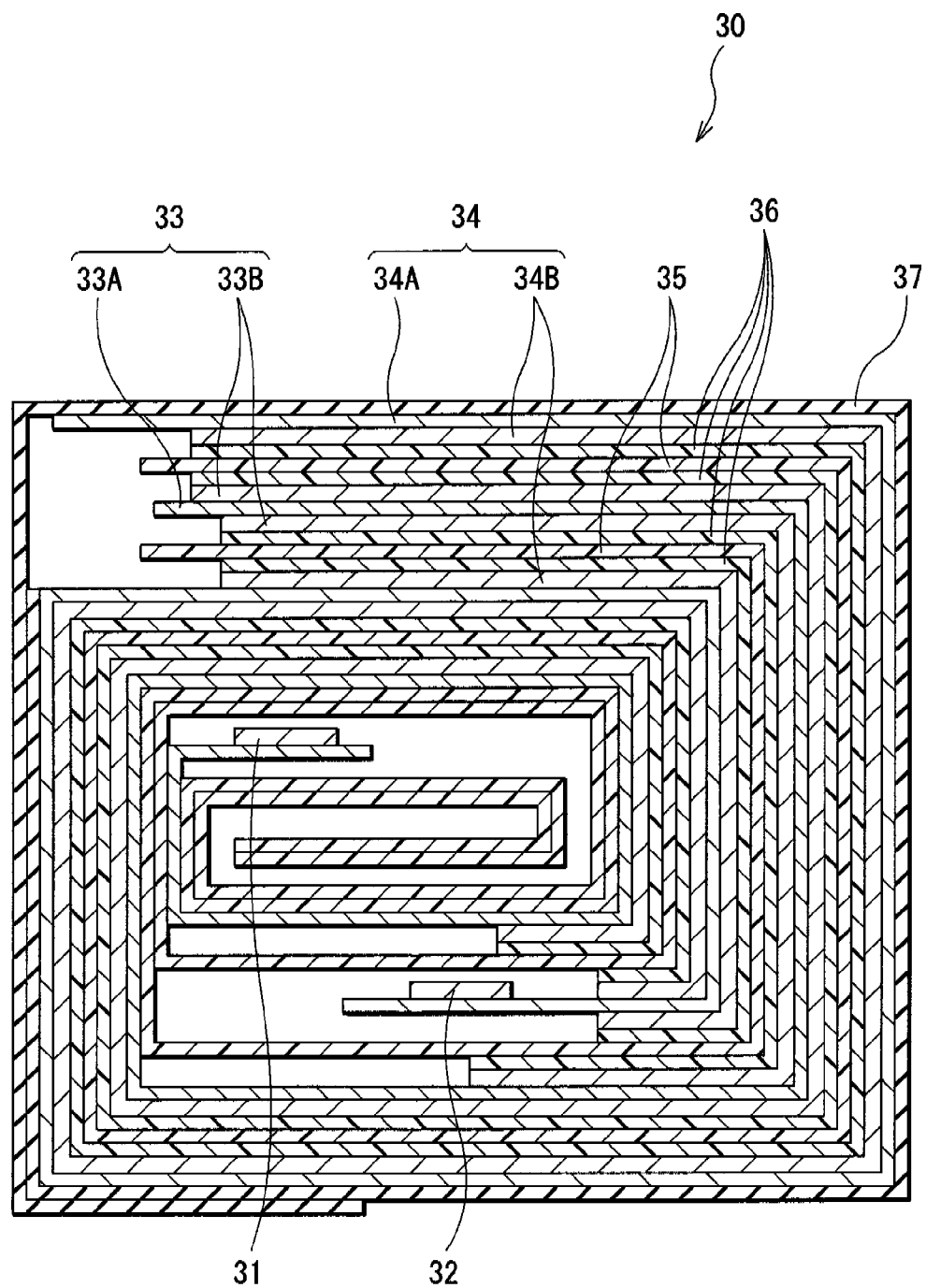
FIG. 4 is a cross section showing a structure taken along line I-I of a spirally wound electrode body shown in FIG. 3.

FIG. 4 shows a cross sectional structure taken along line I-I of the spirally wound electrode body 30 shown in FIG. 3. In the spirally wound electrode body 30, a cathode 33 and an anode 34 are layered with a separator 35 and an electrolyte layer 36 in between and then spirally wound. The outermost periphery thereof is protected by a protective tape 37.

The cathode 33 has a structure in which a cathode active material layer 33B is provided on the both faces of a cathode current collector 33A. The anode 34 has a structure in which an anode active material layer 34B is provided on the both faces of an anode current collector 34A. Arrangement is made so that the anode active material layer 34B faces the cathode active material layer 33B. The structures of the cathode current collector 33A, the cathode active material layer 33B, the anode current collector 34A, the anode active material layer 34B, and the separator 35 are similar to those of the cathode current collector 21A, the cathode active material layer 21B, the anode current collector 22A, the anode active material layer 22B, and the separator 23 in the first or the second embodiment.

The electrolyte layer 36 is so-called gelatinous, containing an electrolytic solution and a polymer compound to become a holding body that holds the electrolytic solution. The gelatinous electrolyte is preferable, since high ion conductivity can be obtained and liquid leakage of the battery can be prevented.

As a polymer compound, for example, polyacrylonitrile, polyvinylidene fluoride, a copolymer of polyvinylidene fluoride and polyhexafluoropropylene, polytetra fluoro ethylene, polyhexafluoropropylene, polyethylene oxide, polypropylene oxide, polyphosphazene, polysiloxane, polyvinyl acetate, polyvinyl alcohol, polymethacrylic acid methyl, polyacrylic acid, polymethacrylic acid, styrene-butadiene rubber, nitrile-butadiene rubber, polystyrene, polycarbonate or the like can be cited. One thereof may be used singly, or two or more thereof may be used by mixing. In particular, in terms of electrochemical stability, polyacrylonitrile, polyvinylidene fluoride, polyhexafluoropropylene, polyethylene oxide or the like is preferably used. The addition amount of the polymer compound to the electrolytic solution varies according to the compatibility thereof, and for example, is preferably in the range from 5 wt % to 50 wt %.

The content of the electrolyte salt is similar to that of the first and the second embodiments described above. However, in this case, the solvent means a wide concept including not only the liquid solvent but also a solvent having ion conductivity capable of dissociating the electrolyte salt. Therefore, when the polymer compound having ion conductivity is used, the polymer compound is also included in the solvent.

The secondary battery can be manufactured, for example, as follows.

First, a precursor solution containing an electrolytic solution, a polymer compound, and a mixed solvent is prepared. Then, the cathode 33 and the anode 34 are respectively coated with the precursor. After that, the mixed solvent is volatilized to form the electrolyte layer 36. Subsequently, the cathode lead 31 is attached to the cathode current collector 33A, and the anode lead 32 is attached to the anode current collector 34A. Subsequently, the cathode 33 and the anode 34 formed with the electrolyte layer 36 are layered with the separator 35 in between to obtain a lamination. After that, the lamination is spirally wound in the longitudinal direction, the protective tape 37 is adhered to the outermost periphery thereof to form the spirally wound electrode body 30. Subsequently, for example, the spirally wound electrode body 30 is sandwiched between the package members 40, and outer edges of the exterior members 40 are contacted by thermal fusion bonding or the like to enclose the spirally wound electrode body 30. At this time, the adhesive films 41 are inserted between the cathode lead 31, the anode lead 32 and the exterior member 40. Thereby, the secondary battery shown in FIGS. 3 and 4 is completed.

Otherwise, the secondary battery may be fabricated as follows. First, the cathode lead 31 and the anode lead 32 are attached on the cathode 33 and the anode 34. After that, the cathode 33 and the anode 34 are layered with the separator 35 in between and spirally wound. The protective tape 37 is adhered to the outermost periphery thereof, and a spirally wound body as a precursor of the spirally wound electrode body 30 is formed. Subsequently, the spirally wound body is sandwiched between the exterior members 40, the peripheral edges except for one side are thermally fusion-bonded to obtain a pouched state, and the spirally wound body is contained inside the pouched-like exterior member 40. Subsequently, a composition of matter for electrolyte containing an electrolytic solution, a monomer as a raw material for a polymer compound, a polymerization initiator, and if necessary other material such as a polymerization inhibitor is prepared, which is injected into the pouched-like package member 40. After that, the opening of the package member 40 is hermetically sealed by, for example, thermal fusion bonding or the like. Finally, the monomer is thermally polymerized to obtain a polymer compound. Thereby, the gelatinous electrolyte layer 36 is formed, and thereby the secondary battery shown in FIGS. 3 and 4 is completed.

The operations and the effects of the secondary battery are similar to those of the first or the second embodiment.

EXAMPLES

Specific examples of the invention will be described in detail.

First, a series of laminated film secondary batteries were fabricated by using graphite as an anode active material with the use of the following procedure.

Example 1-1

90 parts by weight of graphite (median size: 25 µm) as an anode active material, 8 parts by weight of polysulfone powder as a binder, and 2 parts by weight of Vapor Growth Carbon Fiber (VGCF) as an electrical conductor were mixed. The mixture was added with and kneaded with N-methyl-2-pyrrolidone as an extra portion to obtain paste anode mixture slurry. To measure the particle size distribution (median size ($D_{50}$)) of the graphite, a laser diffraction/scattering particle size distribution measuring device LA-920, by Horiba, Ltd. was used. The measurement conditions of the median size are similarly applied to those of the after mentioned examples and comparative examples. Subsequently, the both faces of the anode current collector 34A made of an electrolytic copper foil (15 µm thick) were coated with the anode mixture slurry, which was dried and compression-molded by a rolling press machine so that the thickness on each face became 20 µm. Thereby, the anode active material layer 34B was formed. Subsequently, the anode current collector 34A formed with the anode active material layer 34B was cut in the shape of a strip, and thereby the anode 34 was formed. After that, the anode lead 32 made of nickel was attached to one end of the anode current collector 11 by welding.

Subsequently, 95 parts by weight of lithium cobaltate (average particle diameter of 10 µm) as a cathode active material, 4 parts by weight of polyvinylidene fluoride powder as a binder, and 1 part by weight of carbon black as an electrical conductor were mixed. After that, the mixture was added with and kneaded with N-methyl-2-pyrrolidone as an extra portion to obtain paste cathode mixture slurry. Subsequently, the both faces of the cathode current collector 33A made of an aluminum foil (15 µm thick) were coated with the cathode mixture slurry, which was dried and compression-molded by a rolling press machine, and thereby the cathode active material layer 33B was formed. Subsequently, the cathode current collector 33A formed with the cathode active material layer 33B was cut in the shape of a strip, and thereby the anode 33 was formed. After that, the cathode lead 31 made of aluminum was attached to one end of the cathode current collector 33A by welding.

When the anode active material layer 34B and the cathode active material layer 33B were formed, lithium insertion ability per unit weight of the anode active material and lithium extraction ability per unit weight of the cathode active material were examined in advance, so that the lithium extraction ability per unit area of the cathode active material 33B did not exceed the lithium insertion ability per unit area of the anode active material layer 34B.

Subsequently, the anode 34, the separator 35 made of a microporous polypropylene film (25 µm thick), and the cathode 33 were sequentially layered. After that, the lamination was spirally wound several times to form the spirally wound electrode body 30. Subsequently, the spirally wound electrode body 30 was contained inside the package member 40 made of an aluminum laminated film.

Further, as a solvent, ethylene carbonate, diethyl carbonate, and vinylene carbonate were mixed at a weight ratio of 45:50:5. After that, $LiPF_6$ was dissolved as an electrolyte salt, and thereby the electrolytic solution was prepared. The $LiPF_6$ concentration in the electrolytic solution was 1 mol/kg.

Finally, the foregoing electrolytic solution was injected into the package member 40, and the package member 40 was sealed. Thereby, the laminated-film secondary battery shown in FIGS. 3 and 4 was completed.

Examples 1-2 to 1-4

Secondary batteries were fabricated by a procedure similar to that of Example 1-1, except that the thicknesses of the anode active material layers 34B were respectively changed to 30 µm, 40 µm, and 50 µm.

Example 2-1

A secondary battery was fabricated by a procedure similar to that of Example 1-1, except that polyether sulfone was used as a binder for the anode 34.

Examples 2-2 to 2-4

Secondary batteries were fabricated by a procedure similar to that of Example 2-1, except that the thicknesses of the anode active material layers 34B were respectively changed to 30 µm, 40 µm, and 50 µm.

Example 3-1

A secondary battery was fabricated by a procedure similar to that of Example 1-1, except that a mixture of polysulfone and polyvinylidene fluoride (4 parts by weight of polysulfone powder and 4 parts by weight of polyvinylidene fluoride powder) was used as a binder of the anode 34, and the thickness of the anode active material layer 34B was 50 µm.

Example 3-2

A secondary battery was fabricated by a procedure similar to that of Example 3-1, except that a mixture of polyether sulfone and polyvinylidene fluoride (4 parts by weight of polyether sulfone powder and 4 parts by weight of polyvinylidene fluoride powder) was used as a binder of the anode 34.

Comparative Example 1-1

A secondary battery was fabricated by a procedure similar to that of Example 1-1, except that polyvinylidene fluoride was used as a binder of the anode 34.

Comparative Example 1-2

A secondary battery was fabricated by a procedure similar to that of Comparative example 1-1, except that the thickness of the anode active material layer 34B was 50 µm.

When respective characteristics were examined for the secondary batteries of Examples 1-1 to 1-4, 2-1 to 2-4, 3-1, 3-2 and Comparative Examples 1-1 and 1-2, the results shown in Table 1 were obtained.

First, the state change was observed with the use of nailing test to examine the safety when the battery was broken. In the nailing test, after constant current and constant voltage charge was made at the current corresponding to 1 C of the design rated capacity until 4.4 V, a nail (φ: 2.5 mm) was plunged into the package member in the atmosphere (atmospheric temperature: 23 deg C.) while measuring the internal temperature by a thermocouple thermometer. In the result, based on the change in the appearance and the internal temperature, the battery state after the test was categorized as 3 levels (level 0 to level 2) and evaluated. Level 0 represents no smoking and ignition at the internal temperature of 70 deg C. or less, level 1 represents no smoking and ignition at the internal temperature of 70 deg C. or more, and level 2 represents existence of smoking and ignition at the internal temperature of 70 deg C. or more. Of the foregoing, levels 0 and 1 generating no smoking and ignition are levels allowable as safety when the battery is broken.

Secondary, the discharge capacity retention ratio (%) was determined with the use of cycle test to examine the cycle characteristics. In the cycle test, a charge and discharge process in which after constant current and constant voltage charge was made at the current corresponding to 1 C of the design rated capacity until 4.2 V, constant current discharge was made at the similar current until the final voltage of 2.7 V was regarded as 1 cycle, and 100 cycles were repeated. After the cycle test was ended, (discharge capacity at the 100th cycle/discharge capacity at the first cycle)×100 was calculated, and thereby the discharge capacity retention ratio was obtained.

Thirdly, the state change was observed with the use of 180 deg bending test to examine the electrode strength. In the 180 deg bending test, according to "coating bending test method" based on JIS K 5400, the anode 34 was bent along the surroundings of the axle tree (φ: 2 mm). In the result, based on the appearance change of the anode active material layer 34, the electrode state after the test was categorized as four steps (very good, good, fair, and poor). The step of very good represents no cracks and powders, the step of good represents no cracks but slight powders, the step of fair represents presence of cracks, and the step of poor represents presence of separation, respectively. Of the foregoing, the steps of very good, good and fair without separation mean allowable levels of electrode strength.

TABLE 1

| | Anode active material | Binder | Thickness of anode active material layer (μm) | Nailing test (level) | Discharge capacity retention ratio (%) | Electrode strength |
|---|---|---|---|---|---|---|
| Example 1-1 | Graphite | Polysulfone | 20 | 0 | 87 | very good |
| Example 1-2 | | | 30 | 0 | 84 | good |
| Example 1-3 | | | 40 | 0 | 82 | fair |
| Example 1-4 | | | 50 | 0 | 80 | poor |
| Example 2-1 | Graphite | Polyether sulfone | 20 | 0 | 89 | very good |
| Example 2-2 | | | 30 | 0 | 85 | good |
| Example 2-3 | | | 40 | 0 | 83 | fair |
| Example 2-4 | | | 50 | 0 | 80 | poor |
| Example 3-1 | Graphite | Polysulfone + polyvinylidene fluoride | 50 | 1 | 83 | good |
| Example 3-2 | | polyether sulfone + polyvinylidene fluoride | | 1 | 84 | good |
| Comparative example 1-1 | Graphite | Polyvinylidene fluoride | 20 | 2 | 90 | very good |
| Comparative example 1-2 | | | 50 | 2 | 85 | very good |

As shown in Table 1, the result of the nailing test was non-allowable level (level 2) in Comparative examples 1-1 and 1-2, but allowable level (level 0) in Examples 1-1 to 1-4 and 2-1 to 2-4. Further, in Examples 1-1 to 1-4 and 2-1 to 2-4, the discharge capacity retention ratio as high as that of Comparative examples 1-1 and 1-2 (80% or more) was obtained. In the result, it was confirmed that in the secondary batteries of Examples 1-1 to 1-4 and 2-1 to 2-4, when graphite was used as the anode active material, by using polysulfone or polyether sulfone as a binder, the cycle characteristics were secured, and safety when the battery was broken was improved.

Further, in Examples 3-1 and 3-2, the result of the nailing test was allowable level (level 1), and the discharge capacity retention ratio was 80% or more. Therefore, it was confirmed that in the secondary batteries of Examples 3-1 and 3-2, when polysulfone or polyether sulfone was contained as a binder, effects similar to those of the secondary batteries of Examples 1-1 to 1-4 and 2-1 to 2-4 could be obtained as well.

In Comparative examples 1-1 and 1-2, the electrode strength was allowable (very good) in regardless of the thickness of the anode active material layer 34B. However, in Examples 1-1 to 1-4 and 2-1 to 2-4, the difference (very good, good, fair and poor) was generated according to the thickness of the anode active material layer 34B. Specifically, there was a tendency that as the thickness of the anode active material layer 34B was increased, the electrode strength was lowered. When the thickness was 40 μm or less, the result was allowable (very good, good and fair). It means that though in terms of the electrode strength, polyvinylidene fluoride is more advantageous than polysulfone and polyether sulfone, even when polysulfone and polyether sulfone were used, the sufficient electrode strength could be obtained by setting the appropriate thickness of the anode active material layer 34B. In the result, it was confirmed that in the secondary batteries of Examples 1-1 to 1-4 and 2-1 to 2-4, by setting the thickness of the anode active material layer 34B to 40 μm or less, the electrode strength was secured even when polysulfone and polyether sulfone were used as a binder. In this case, in particular, to secure the energy density of the anode active material layer 34B distributing to the discharge capacity retention ratio, the thickness of the anode active material layer 34B is preferably 20 μm or more.

Since the secondary batteries of the examples 3-1 and 3-2 included polyvinylidene fluoride working advantageously for the electrode strength, the electrode strength of the secondary batteries of the examples 3-1 and 3-2 was allowable (good) even when the thickness of the anode active material layer 34B was 50 μm or more, unlike Examples 1-1 to 1-4 and 2-1 to 2-4. Therefore, in the secondary batteries of Examples 3-1 and 3-2, it was confirmed that since these secondary batteries included polysulfone or polyether sulfone as a binder, effects similar to those of the secondary batteries of Examples 1-1 to 1-4 and 2-1 to 2-4 could be obtained, and in particular, in terms of the electrode strength, the degree of freedom the thickness of the anode active material layer 34B was increased.

Next, by the following procedure, the laminated-film secondary batteries were fabricated by using silicon as the anode active material.

Example 4-1

A secondary battery was fabricated by a procedure similar to that of Example 1-1, except that the anode 34 was formed by different procedure. The anode 34 was formed as follows. First, 88 parts by weight of crystalline silicon powder (median diameter of 2 μm) as an anode active material, 8 parts by weight of polysulfone powder as a binder, 2 parts by weight of acetylene black as an electrical conductor, and 2 parts by weight of hydroxypropyl cellulose powder as a thickening agent were mixed. After that, the mixture was added with and kneaded with N-methyl-2-pyrrolidone as an extra portion to obtain paste anode mixture slurry. Subsequently, the both faces of the anode current collector 34A made of an electrolytic copper foil (15 μm thick) were coated with the anode mixture slurry, which was dried and compression-molded by a rolling press machine so that the thickness on each face became 5 μm. Thereby, the anode current collector 34B was formed. Finally, the anode current collector 34A formed with the anode active material layer 34B was heated for 3 hours at 400 deg C., and then the resultant was cut in a strip shape.

Examples 4-2 to 4-4

Secondary batteries were fabricated by a procedure similar to that of Example 4-1, except that the thicknesses of the anode active material layers 34B were respectively changed to 20 μm, 30 μm, and 40 μm.

Example 5-1

A secondary battery was fabricated by a procedure similar to that of Example 4-1, except that polyether sulfone was used as a binder for the anode 34.

Examples 5-2 to 5-4

Secondary batteries were fabricated by a procedure similar to that of Example 5-1, except that the thicknesses of the anode active material layers 34B were respectively changed to 20 μm, 30 μm, and 40 μm.

Example 6-1

A secondary battery was fabricated by a procedure similar to that of Example 4-1, except that a mixture of polysulfone and polyvinylidene fluoride (4 parts by weight of polysulfone powder and 4 parts by weight of polyvinylidene fluoride powder) was used as a binder of the anode 34, and the thickness of the anode active material layer 34B was 40 μm.

Example 6-2

A secondary battery was fabricated by a procedure similar to that of Example 6-1, except that a mixture of polyether sulfone and polyvinylidene fluoride (4 parts by weight of polyether sulfone powder and 4 parts by weight of polyvinylidene fluoride powder) was used as a binder of the anode 34.

Example 6-3

A secondary battery was fabricated by a procedure similar to that of Example 6-1, except that a mixture of polysulfone and polyimide (4 parts by weight of polysulfone powder and 4 parts by weight of polyimide powder) was used as a binder of the anode 34. As the polyimide, a compound expressed by Chemical formula 4 in which R was Chemical formula 5(2) was used. Such a compound was used in the following examples and comparative examples using polyimide.

Example 6-4

A secondary battery was fabricated by a procedure similar to that of Example 6-1, except that a mixture of polyether sulfone and polyimide (4 parts by weight of polyether sulfone powder and 4 parts by weight of polyimide powder) was used as a binder of the anode 34.

Comparative Example 2-1

A secondary battery was fabricated by a procedure similar to that of Example 4-1, except that polyvinylidene fluoride was used as a binder of the anode 34, and the thickness of the anode active material layer 34B was 40 μm.

Comparative Example 2-2

A secondary battery was fabricated by a procedure similar to that of Comparative example 2-1, except that polyimide was used as a binder of the anode 34.

When respective characteristics shown in Table 1 were examined for the secondary batteries of Examples 4-1 to 4-4, 5-1 to 5-4, 6-1 to 6-4 and Comparative Examples 2-1 and 2-2, the results shown in Table 2 were obtained.

TABLE 2

| | Anode active material | Binder | Thickness of anode active material layer (μm) | Nailing test (level) | Discharge capacity retention ratio (%) | Electrode strength |
|---|---|---|---|---|---|---|
| Example 4-1 | Silicon | Polysulfone | 5 | 0 | 82 | very good |
| Example 4-2 | | | 20 | 0 | 78 | very good |
| Example 4-3 | | | 30 | 0 | 75 | fair |
| Example 4-4 | | | 40 | 0 | 66 | poor |
| Example 5-1 | Silicon | Polyether sulfone | 5 | 0 | 81 | very good |
| Example 5-2 | | | 20 | 0 | 77 | very good |
| Example 5-3 | | | 30 | 0 | 72 | fair |
| Example 5-4 | | | 40 | 0 | 64 | poor |
| Example 6-1 | Silicon | Polysulfone + polyvinylidene fluoride | 40 | 1 | 74 | good |
| Example 6-2 | | polyether sulfone + polyvinylidene fluoride | | 1 | 74 | good |
| Example 6-3 | | Polysulfone + polyimide | | 0 | 77 | good |
| Example 6-4 | | polyether sulfone + polyimide | | 0 | 78 | good |
| Comparative example 2-1 | Silicon | Polyvinylidene fluoride | 40 | 2 | 75 | very good |
| Comparative example 2-2 | | Polyimide | | 2 | 78 | very good |

As shown in Table 2, the result of the nailing test was non-allowable level (level 2) in Comparative examples 2-1 and 2-2, but allowable level (level 0) in Examples 4-1 to 4-4 and 5-1 to 5-4. Further, in Examples 4-1 to 4-4 and 5-1 to 5-4, the discharge capacity retention ratio as high as that of Comparative examples 2-1 and 2-2 (60% or more) was obtained. In the result, it was confirmed that in the secondary batteries of Examples 4-1 to 4-4 and 5-1 to 5-4, when silicon was used as the anode active material, by using polysulfone or polyether sulfone as a binder, the cycle characteristics were secured, and safety when the battery was broken was improved.

Further, in Examples 6-1 to 6-4, the result of the nailing test was allowable level (level 0 or 1), and the discharge capacity retention ratio was 60% or more. Therefore, it was confirmed that in the secondary batteries of Examples 6-1 to 6-4, when polysulfone or polyether sulfone was included as a binder, effects similar to those of the secondary batteries of Examples 4-1 to 4-4 and 5-1 to 5-4 could be obtained as well. In this case, in particular, the result of the nailing test of Examples 6-3 and 6-4 (level 0) was more favorable than that of Examples 6-1 and 6-2 (level 1). Therefore, as a resin used together with polysulfone or polyether sulfone, polyimide is more preferable than polyvinylidene fluoride.

In Comparative examples 2-1 and 2-2, the electrode strength was allowable (very good). However, in Examples 4-1 to 4-4 and 5-1 to 5-4, there was a tendency that as the thickness of the anode active material layer 34B was increased, the electrode strength was lowered (very good, good, fair and poor). When the thickness was 30 μm or less, the result was allowable (very good, good and fair). It means that though in terms of the electrode strength, polyvinylidene fluoride and polyimide were more advantageous than polysulfone and polyether sulfone, even when polysulfone and polyether sulfone were used, the sufficient electrode strength could be obtained by setting the appropriate thickness of the anode active material layer 34B. In the result, it was confirmed that in the secondary batteries of Examples 4-1 to 4-4 and 5-1 to 5-4, by setting the thickness of the anode active material layer 34B to 30 μm or less, the electrode strength was secured even when polysulfone and polyether sulfone were used as a binder. In this case, in particular, to secure the energy density of the anode active material layer 34B distributing to the discharge capacity retention ratio, the thickness of the anode active material layer 34B is preferably 5 μm or more.

Since the secondary batteries of the examples 6-1 to 6-4 contained polyvinylidene fluoride or polyimide working advantageously for the electrode strength, the electrode strength of the secondary batteries of the examples 6-1 to 6-4 was allowable (good) even when the thickness of the anode active material layer 34B was 40 μm or more, unlike Examples 4-1 to 4-4 and 5-1 to 5-4. Therefore, in the secondary batteries of Examples 6-1 to 6-4, it was confirmed that since the secondary batteries contained polysulfone or polyether sulfone as a binder, effects similar to those of the secondary batteries of Examples 4-1 to 4-4 and 5-1 to 5-4 could be obtained, and in particular, in terms of the electrode strength, the freedom degree of the thickness of the anode active material layer 34B was widened.

Finally, by the following procedure, the laminated-film secondary batteries were fabricated by changing the content of the binder of the anode 34.

Example 7-1

A secondary battery was fabricated by a procedure similar to that of Example 1-1, except that the anode 34 was formed by different procedure. The anode 34 was formed as follows. First, 94 parts by weight of graphite (median diameter of 25 μm) as an anode active material, 4 parts by weight of polysulfone powder as a binder, and 2 parts by weight of VGCF as an electrical conductor were mixed. After that, the mixture was added with and kneaded with N-methyl-2-pyrrolidone as an extra portion to obtain paste anode mixture slurry. Subsequently, the both faces of the anode current collector 34A made of an electrolytic copper foil (15 μm thick) were coated with the anode mixture slurry, which was dried and compression-molded by a rolling press machine so that the thickness on each face became 20 μm. Thereby, the anode active material layer 34B was formed. Finally, the anode current collector 34A formed with the anode active material layer 34B was cut in a strip shape so that a given width and a given length could be obtained.

Example 7-2

A secondary battery was fabricated by a procedure similar to that of Example 7-1, except that the contents of the anode active material and the binder were 88 parts by weight and 10 parts by weight, respectively.

Example 7-3

A secondary battery was fabricated by a procedure similar to that of Example 7-1, except that the contents of the anode active material and the binder were 83 parts by weight and 15 parts by weight, respectively.

Example 8-1

A secondary battery was fabricated by a procedure similar to that of Example 7-1, except that polyether sulfone was used as a binder of the anode 34.

Example 8-2

A secondary battery was fabricated by a procedure similar to that of Example 7-2, except that polyether sulfone was used as a binder of the anode 34.

Example 8-3

A secondary battery was fabricated by a procedure similar to that of Example 7-3, except that polyether sulfone was used as a binder of the anode 34.

Example 9-1

A secondary battery was fabricated by a procedure similar to that of Example 1-1, except that the anode 34 was formed by different procedure. The anode 34 was formed as follow. First, 92 parts by weight of crystalline silicon powder (median diameter of 2 µm) as an anode active material, 4 parts by weight of polysulfone powder as a binder, 2 parts by weight of acetylene black as an electrical conductor, and 2 parts by weight of hydroxypropyl cellulose powder as a thickening agent were mixed. After that, the mixture was added with and kneaded with N-methyl-2-pyrrolidone as an extra portion to obtain paste anode mixture slurry. Subsequently, the both faces of the anode current collector 34A made of an electrolytic copper foil (15 µm thick) were coated with the anode mixture slurry, which was dried and compression-molded by a rolling press machine so that the thickness of each face became 20 µm. Thereby, the anode active material layer 34B was formed. Finally, the anode current collector 34A formed with the anode active material layer 34B was heated for 3 hours at 400 deg C., and then the resultant was cut in a strip shape.

Example 9-2

A secondary battery was fabricated by a procedure similar to that of Example 9-1, except that the contents of the anode active material and the binder were 76 parts by weight and 20 parts by weight, respectively.

Example 9-3

A secondary battery was fabricated by a procedure similar to that of Example 9-1, except that the contents of the anode active material and the binder were 71 parts by weight and 25 parts by weight, respectively.

Example 10-1

A secondary battery was fabricated by a procedure similar to that of Example 9-1, except that polyether sulfone was used as a binder of the anode 34.

Example 10-2

A secondary battery was fabricated by a procedure similar to that of Example 9-2, except that polyether sulfone was used as a binder of the anode 34.

Example 10-3

A secondary battery was fabricated by a procedure similar to that of Example 9-3, except that polyether sulfone was used as a binder of the anode 34.

When respective characteristics shown in Table 1 were examined for the secondary batteries of Examples 7-1 to 7-3, 8-1 to 8-3, 9-1 to 9-3 and 10-1 to 10-3, the results shown in Table 3 were obtained.

TABLE 3

| | Anode active material | Binder/content | (wt %) | Thickness of anode active material layer (µm) | Nailing test (level) | Discharge capacity retention ratio (%) | Electrode strength |
|---|---|---|---|---|---|---|---|
| Example 7-1 | Graphite | Polysulfone | 4 | 20 | 0 | 83 | fair |
| Example 7-2 | | | 10 | | 0 | 85 | very good |
| Example 7-3 | | | 15 | | 0 | 80 | very good |
| Example 8-1 | Graphite | Polyether sulfone | 4 | 20 | 0 | 84 | fair |
| Example 8-2 | | | 10 | | 0 | 86 | very good |
| Example 8-3 | | | 15 | | 0 | 80 | very good |
| Example 9-1 | Silicon | Polysulfone | 4 | 20 | 0 | 74 | fair |
| Example 9-2 | | | 20 | | 0 | 76 | very good |
| Example 9-3 | | | 25 | | 0 | 62 | very good |
| Example 10-1 | Silicon | Polyether sulfone | 4 | 20 | 0 | 73 | fair |
| Example 10-2 | | | 20 | | 0 | 75 | very good |
| Example 10-3 | | | 25 | | 0 | 60 | very good |

As evidenced by Table 3, in all Examples 7-1 to 7-3 and 8-1 to 8-3, the result of the nailing test was allowable level (level 0), the high discharge capacity retention ration of 80% or more was obtained, and the allowable electrode strength (ver good, good and fair) was obtained. Then, taking count of the influence of the content of polysulfone or polyether sulfone on the discharge capacity retention ration, in all Examples 7-1 to 7-3 and 8-1 to 8-3, the discharge capacity retention ratio exceeding 80% was obtained when the content was 10 wt % or less. In the result, it was confirmed that in the secondary batteries of Examples 7-1 to 7-3 and 8-1 to 8-3, when graphite was used as the anode active material, by setting the content of polysulfone or polyether sulfone to 10 wt % or less, high discharge capacity retention ratio could be obtained. In this case, in particular, to secure both the discharge capacity retention ratio and the electrode strength, the content of polysulfone or polyether sulfone is preferably 4 wt % or more.

Further, in all examples 9-1 to 9-3 and 10-1 to 10-3, the result of the nailing test was allowable level (level 0), the high discharge capacity retention ratio of 60% or more could be obtained, and the allowable electrode strength (very good, good and fair) could be obtained. Then, taking count of the influence of the content of polysulfone or polyether sulfone on the discharge capacity retention ratio, in all Examples 9-1 to 9-3 and 10-1 to 10-3, the discharge capacity retention ratio exceeding 70% was obtained when the content was 20 wt % or less. In the result, it was confirmed that in the secondary batteries of Examples 9-1 to 9-3 and 10-1 to 10-3, when silicon was used as the anode active material, by setting the content of polysulfone or polyether sulfone to 20 wt % or less, the high discharge capacity retention ratio could be obtained. In this case, in particular, to secure both the discharge capacity retention ratio and the electrode strength, the content of polysulfone or polyether sulfone is preferably 4 wt % or more.

The invention has been described with reference to the embodiments and the examples. However, the invention is not limited to the foregoing embodiments and the aspects described in the foregoing examples, and various modifications may be made. For example, in the foregoing embodiments and the foregoing examples, descriptions have been given of the case using the electrolytic solution or the gelatinous electrolyte in which an electrolytic solution is held in a polymer compound as an electrolyte for the battery of the invention. However, other type of electrolyte may be used. As other electrolyte, for example, a mixture of an ion conductive inorganic compound such as ion conductive ceramics, ion conductive glass, and ionic crystal and an electrolytic solution; a mixture of other inorganic compound and an electrolytic solution; or a mixture of the foregoing inorganic compound and a gelatinous electrolyte can be cited.

Further, in the foregoing embodiments and the foregoing examples, descriptions have been given with specific examples of the cylindrical or laminated-film type secondary battery as a battery structure of the battery of the invention. However, the battery of the invention can be similarly applied to a battery having other shape such as a coin type battery, a button type battery, and a square battery, or a battery having other structure such as a lamination structure. Further, the battery of the invention can be applied to other batteries such as primary batteries in addition to the secondary batteries.

Further, in the foregoing embodiments and the foregoing examples, regarding the thickness of the anode active material layer and the content of the resin containing sulfur in the battery of the invention, the appropriate ranges thereof derived from the results of the examples have been described. However, such a description does not totally eliminate the possibility that the thickness and the content may be out of the foregoing ranges. That is, the foregoing appropriate ranges are ranges particularly preferable for obtaining the effects of the invention. Therefore, as long as effects of the invention can be obtained, the thickness and the content may be out of the foregoing ranges in some degrees.

It should be understood by those skilled in the art that various modifications, combinations, sub-combinations and alternations may occur depending on design requirements and other factors insofar as they are within the scope of the appended claims or the equivalents thereof.

What is claimed is:

1. A battery comprising:
   a cathode;
   an anode comprising an anode active material layer; and
   an electrolyte;
   wherein,
   the anode active material layer comprises (i) a binder, the binder including an amount of a first resin not containing sulfur and an amount of a second resin containing sulfur (S), and (ii) a carbon material,
   the anode active material layer has a thickness of 40 μm or less,
   the amount of the second resin containing sulfur is 10 wt % or less of the anode active material, and
   the amount of the second resin containing sulfur is greater that the amount of the first resin not containing sulfur.

2. The battery according to claim 1, wherein the second resin containing sulfur has a sulfone bond (—SO$_2$—) or a thioether bond (—S—).

3. The battery according to claim 1, wherein the second resin containing sulfur has a structure shown in Chemical formula 1:

Chemical formula 1

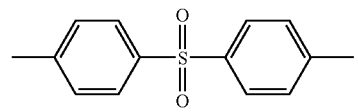

4. The battery according to claim 1, wherein the second resin containing sulfur is at least one selected from the group consisting of polysulfone and polyether sulfone.

5. The battery according to claim 1, wherein the second resin containing sulfur is a binder.

6. The battery according to claim 1, wherein the first resin contains at least one selected from the group consisting of polyvinylidene fluoride and polyimide.

7. The battery according to claim 1, wherein the first resin not containing sulfur has a structure selected from the group consisting of:

Formula 4

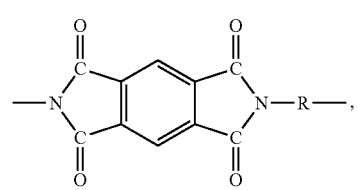

wherein R is selected from the group consisting of an ether bond (—O—), an ester bond (—O—CO—), a methylene group (—CH$_2$—), a dimethyl methylene group (—C9CH$_3$)$_2$—), and a carbonyl group (—CO—);

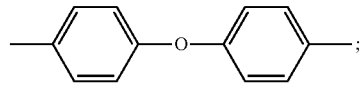
Formula 5(2)

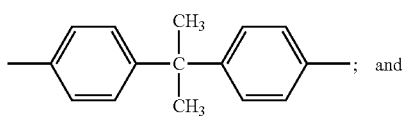
Formula 5(3)

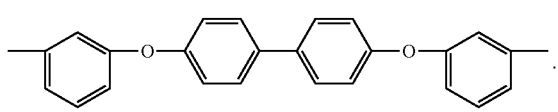
Formula 5(4)

8. A battery comprising:
a cathode;
an anode comprising an anode active material layer; and
an electrolyte;
wherein,
the anode active material layer comprises (i) a binder, the binder including an amount of a first resin and an amount of a second resin containing sulfur (S), and (ii) at least one material selected from the group consisting of a simple substance, an alloy, and a compound of silicon (Si) or tin (Sn),
the anode active material layer has a thickness of 30 μm or less,
a content of the second resin containing sulfur is 20 wt % or less of the anode active material, and
the amount of the second resin containing sulfur is greater that the amount of the first resin.

9. The battery according to claim 8, wherein the second resin containing sulfur has a sulfone bond (—SO$_2$—) or a thioether bond (—S—).

10. The battery according to claim 8, wherein the second resin containing sulfur has a structure shown in Chemical formula 1:

Chemical Formula 8

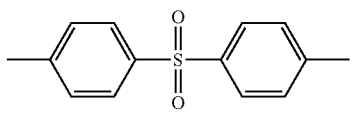

11. The battery according to claim 8, wherein the second resin containing sulfur is at least one selected from the group consisting of polysulfone and polyether sulfone.

12. The battery according to claim 8, wherein the second resin containing sulfur is a binder.

13. The battery according to claim 8, wherein the first resin not containing sulfur contains at least one selected from the group consisting of polyvinyl idene fluoride and polyimide.

14. The battery according to claim 8, wherein the first resin not containing sulfur has a structure selected from the group consisting of:

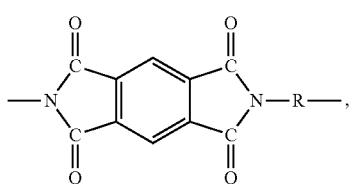
Formula 4 wherein R is selected from the group consisting of an ether bond (—O—), an ester bond (—O—CO—), a methylene group (—CH$_2$—), a dimethyl methylene group (—C(CH$_3$)$_2$—), and a carbonyl group (—CO—);

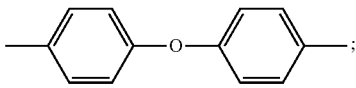
Formula 5(2)

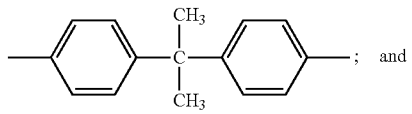
Formula 5(3)

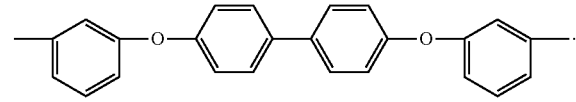
Formula 5(4)

15. The battery of claim 8, wherein the anode active material layer comprises (i) a binder, the binder including an amount of a first a resin and an amount of a second resin containing S, and (ii) at least one compound of silicon (Si) or tin (Sn).

* * * * *